US006410655B2

(12) United States Patent
Okubo et al.

(10) Patent No.: US 6,410,655 B2
(45) Date of Patent: Jun. 25, 2002

(54) RESIN COMPOSITION FOR AQUEOUS PAINT

(75) Inventors: Masayoshi Okubo, Hyogo; Shinya Sakaguchi, Wakayama; Atsushi Takamatsu, Tochigi; Hiroharu Sasaki, Tochigi; Kazuyoshi Tsuneta, Tochigi, all of (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 09/731,721

(22) Filed: Dec. 8, 2000

(30) Foreign Application Priority Data

Dec. 9, 1999 (JP) ............................................. 11-349808

(51) Int. Cl.$^7$ ...................... C08F 265/02; C08F 220/26; C08F 8/14
(52) U.S. Cl. ................ 525/330.1; 525/231; 526/318.42; 526/320; 526/329.6; 523/201
(58) Field of Search ............................... 525/330.1, 231; 526/318.42, 320, 329.6; 523/201

(56) References Cited

U.S. PATENT DOCUMENTS

| 4,170,582 | A |   | 10/1979 | Mori et al. |
| 4,427,836 | A | * | 1/1984  | Kowalski et al. ............ 525/301 |
| 5,081,166 | A |   | 1/1992  | Kiehlbauch et al. |
| 5,086,143 | A | * | 2/1992  | Sutton et al. ................ 526/320 |
| 5,306,743 | A |   | 4/1994  | Klesse et al. |
| 5,773,519 | A |   | 6/1998  | Ito et al. |

FOREIGN PATENT DOCUMENTS

| EP | 0 292 261   | 11/1988 |
| EP | 0 478 193   | 4/1992  |
| WO | WO 94/04581 | 3/1994  |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

A resin composition for an aqueous paint containing different phase structure emulsion particles obtained by multi-stage emulsion polymerization as a binder, wherein the different phase structure emulsion particles have an outermost phase formed by an emulsion polymer of an ethylenic unsaturated monomer, having a glass transition temperature of from −50° C. to 10° C., and satisfy the following conditions (1) to (3):

(1) the emulsion polymer forming the outermost phase contains from 1 to 20 mass % of an ethylenic unsaturated monomer having at least one of a polyethylene glycol chain and a polypropylene glycol chain, (2) at least one phase of inner phases from the outermost phase of the different phase structure emulsion particles comprises an emulsion polymer of an ethylenic unsaturated monomer having a glass transition temperature of from 30° C. to 110° C., and (3) the binder has a minimum film-forming temperature of at most 10° C.

16 Claims, No Drawings

RESIN COMPOSITION FOR AQUEOUS PAINT

The present invention relates to a resin composition for an aqueous paint, which contains substantially no volatile organic compound (hereinafter referred to as "VOC") and has excellent freezing-thawing stability and low temperature film-formability and forms a film excellent in anti-blocking property and water resistance.

Recently, environmental regulations became stricter with regard to reduction of toxicity and a VOC, and also from a viewpoint of saving resources, it is demanded to use water in place of an organic solvent as a solvent for a paint in the field of paint business. Its typical paint is an aqueous emulsion paint, but since the aqueous emulsion paint employs water as a solvent, there are problems that its dispersion state is changed by freezing-thawing cycle during storage and freezing-thawing stability is poor due to viscosity rise or coalescing. Therefore, it is heretofore general to employ an organic solvent including ethylene glycol as a freeze-proofing agent, thereby improving freezing-thawing stability.

Also, an aqueous emulsion resin has an inherent minimum film-forming temperature (hereinafter referred to as "MFT"), and when a surface to be coated has a temperature of lower than MFT, it was necessary to blend an organic solvent as a coalescing agent for film-formation. Thus, the aqueous emulsion paint contains a considerable amount of a VOC, and when drying of a coated film is insufficient, there are problems of adversely affecting water resistance and anti-blocking property by the presence of the remaining VOC.

Therefore, it has been studied to reduce VOC as much as possible from an aqueous emulsion paint in order to solve environmental problems, to save resources and to prevent orders. For example, there has been developed a paint having a VOC reduced by using a low MFT aqueous emulsion resin, but the paint using a low MFT aqueous emulsion resin is poor in water resistance and anti-blocking property and provides a problem that a coated film strength is poor. Also, an aqueous emulsion paint having a low VOC amount, which is improved in freezing-thawing stability, is disclosed, for example, in JP-A-8-302238.

However, when this paint is stored in a frozen state for a long term, the freezing-thawing stability becomes poor and a coated film obtained provides problems that anti-blocking property and water resistance become poor.

The present invention has been made by taking these prior arts into consideration. Thus, an object of the present invention is to provide a resin composition for an aqueous paint for forming a coating film having excellent anti-blocking property and also having excellent freezing-thawing stability and low temperature film-formability, without using a VOC as a coalescing agent and an anti-freezing agent which are resources of providing environmental pollution and odor, or with only a very small amount of these additives.

In order to solve the above problems, the present inventors have intensively studied, and have discovered that the above problems are surely solved by providing the following constitution. The present invention is based on this discovery.

That is, the present invention relates to a resin composition for an aqueous paint, containing different phase structure emulsion particles obtained by multi-stage emulsion polymerization as a binder, wherein the different phase structure emulsion particles have an outermost phase formed by an emulsion polymer of an ethylenic unsaturated monomer having a glass transition temperature of from −50° C. to 10° C., and satisfy the following conditions (1) to (3):

(1) the emulsion polymer forming the outermost phase contains from 1 to 20 mass % of an ethylenic unsaturated monomer having at least one of a polyethylene glycol chain and a polypropylene glycol chain, (2) at least one phase present in the inside from the outermost phase of the different phase structure emulsion particles comprises an emulsion polymer of an ethylenic unsaturated monomer having a glass transition temperature of from 30° C. to 110° C., and (3) the binder has a minimum film-forming temperature of at most 10° C.

Hereinafter, the present invention is described in more details.

A resin composition for an aqueous paint of the present invention employs different phase structure emulsion particles prepared by multi-stage emulsion polymerization of an ethylenic unsaturated monomer in water as a binder.

The multi-stage emulsion polymerization is carried out by at least 2 stages, usually from 2 to 5 stages of emulsion polymerization of an ethylenic unsaturated monomer in water in accordance with a well known emulsion polymerization process, and the emulsion polymer of an ethylenic unsaturated monomer thus formed constitutes different phase structure emulsion particles comprising the outermost phase and at least one phase of inner phases.

A typical example of the multi-stage emulsion polymerization process includes a process of a plurality of steps of repeating emulsion polymerization of an ethylenic unsaturated monomer at an elevated temperature of from 60 to 90° C. in the presence of an emulsifying agent and a polymerization initiator, and further optionally a chain transfer agent and an emulsion stabilizer.

Examples of the emulsifier include an aliphatic acid salt such as sodium lauryl sulfate, a higher alcohol sulfuric acid ester salt, an alkylbenzene sulfonate such as sodium dodecylbenzene sulfonate, a polyoxyethylenealkylether sulfuric acid salt, ammonium polyoxynonylphenylether sulfonate, polyoxyethylene polyoxypropylene glycol ether sulfuric acid salt, a reactive emulsifier such as a monomer having a sulfonic acid group or a sulfuric ester group, and other anionic surfactants; a polyoxyethylene alkylether, polyoxynonylphenylether, a sorbitan aliphatic acid ester, a polyoxyethylene aliphatic acid ester, a polyoxyethylene-polyoxypropylene block copolymer, a reactive nonionic surfactant and other nonionic surfactants; an alkylamine salt, a quaternary ammonium salt and other cationic surfactants; (modified)polyvinyl alcohol, and the like.

Examples of the polymerization initiator include those generally used for radical polymerization, and among them, a water-soluble material is preferable, examples of which include persulfates such as potassium persulfate and ammonium persulfate, azo type compounds such as 2,2'-azobis(2-amidinopropane)hydrochloride, 4,4'-azobis-cyanovaleric acid, 2,2'-azobis(2-methylbutaneamidoxime) dihydrochloride tetrahydrate and the like, aqueous hydrogen peroxide, t-butylhydroperoxide and other peroxides. Further, a redox type compound including a combination of ferrous sulfate and a reducing agent such as L-ascorbic acid and sodium thiosulfate are also usable.

Examples of the chain transfer agent include long chain alkylmercaptans such as N-dodecylmercaptan, aromatic mercaptans, hydrogenated hydrocarbons and the like.

Examples of the emulsion stabilizer include polyvinyl alcohol, hydroxylethylcellulose, polyvinylpyrrolidone and the like.

The emulsion polymerization is carried out by a one time-charging method of charging a monomer one time, a monomer-dropping method of continuously dropping a monomer, a preemulsion method of previously mixing and emulsifying a monomer, water and an emulsifier and dropping the emulsified product, or a combination of these methods.

According to the present invention, in the preparation of different phase structure emulsion particles as a binder in accordance with the above-mentioned methods, as an ethylenic unsaturated monomer which is added at the final stage of multi-stage emulsion polymerization and forms the outermost phase, it is necessary to use an ethylenic unsaturated monomer containing an ethylenic unsaturated monomer having at least one of a polyethylene glycol chain and a polypropylene glycol chain in an amount of from 1 to 20 mass %, preferably from 5 to 15 mass %, of the total ethylenic unsaturated monomers in such a manner as to provide the outermost phase comprising an emulsion polymer having a glass transition temperature (hereinafter referred to as "Tg") of from −50° C. to 10° C., preferably from −30° C. to 0° C. Also, it is necessary to use such an ethylenic unsaturated monomer as to provide at least one phase of inner phases, comprising an emulsion polymer having a Tg of from 30° C. to 110° C., preferably from 34° C. to 90° C.

Also, it is necessary to use a binder having a minimum film-forming temperature (MFT) of at most 10° C., preferably at most 5° C.

By satisfying these conditions, it is possible to form a coating film having excellent freezing-thawing stability, low temperature film-formability, anti-blocking property and water resistance without using or with only a very small amount use of a VOC as an anti-freezing agent or a coalescing agent.

Also, in the present invention, a Tg value of an emulsion polymer can be calculated in accordance with the following FOX formula.

$$1/Tg = W_1/Tg_1 + W_2/Tg_2 + \ldots + Wi/Tgi + \ldots + W_n/Tg_n$$

(In the above FOX formula, Tgi(K) represents a glass transition temperature of a homopolymer of each monomer constituting a polymer comprising n kinds of monomers, and Wi represents a mass % of each monomer, i.e. $(W_1+W_2+ \ldots +Wi+ \ldots W_n=1.)$ In the present invention, when a Tg value of an emulsion polymer of the outermost phase of different phase structure emulsion particles is less than −50° C., a coating film obtained therefrom becomes poor in pollution resistance and water resistance. On the contrary, when the Tg value exceeds 10° C., film-formability becomes unpreferably poor at a low temperature.

On the other hand, when Tg values of emulsion polymers of all phases constituting inner phases are less than 30° C., a coating film obtained therefrom becomes poor in anti-blocking property and other physical strengths, and on the contrary, when the Tg values exceed 110° C., it is not preferable since the reaction does not satisfactorily proceed.

Also, when a MFT value of a binder exceeds 10° C., film-formability becomes unpreferably poor at a low temperature in winter.

Hereinafter, an ethylenic unsaturated monomer used for forming different phase structure emulsion particles is explained.

As described above, it is necessary for an ethylenic unsaturated monomer used for an emulsion polymer forming the outermost phase to contain an ethylenic unsaturated monomer having at least one of a polyethylene glycol chain and a polypropylene glycol chain as the essential component.

Said monomer is represented by the following formula (1), (2) or (3).

Formula (1):

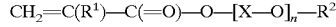

(Wherein $R^1$ is H or $CH_3$, $R^2$ is H or a $C_1$–$C_8$ alkyl group, X is —$(CH_2)_2$— or —$CH_2CH(CH_3)$—, and n is an integer of from 1 to 30.)

Formula (2):

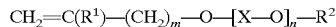

(Wherein $R^1$, $R^2$, X and n are as defined in the above formula (1), and m is an integer of from 1 to 30.)

Formula (3):

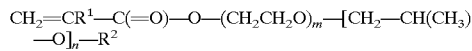

(Wherein $R^1$ and $R^2$ are as defined in the above formula (1), and m and n are an integer of from 1 to 30.)

If the amount of a monomer represented by the above formulas in the total ethylenic unsaturated monomers forming the outermost phase is less than 1 mass %, freezing-thawing stability of a paint becomes poor, and on the contrary, if this amount exceeds 20 mass %, a coating film obtained therefrom becomes unpreferably poor in water resistance.

These monomers can be easily prepared, for example, by addition-polymerizing ethylene oxide and/or propylene oxide with (meth)acrylic acid, allyl alcohol or the like and then optionally by ether-forming with a $C_1$–$C_8$ alkyl group. Examples of these monomers include monomers of tradenames such as "MA-30", "MA-50", "MA-100", "MA-150" and "MPG-130MA" (manufactured by Nippon Nyukazai K. K.), "Blenmer PE", "Blenmer PP", "Blenmer AP-400", "Blenmer AE-350", and "Blenmer PEP" (manufactured by Nippon Yushi K. K.), and the like.

Also, various ethylenic unsaturated monomers used conventionally in the preparation of acrylic resin can be used without any restriction as comonomers copolymerizable with monomers represented by the above formulas.

Examples of these comonomers include (meth)acrylate type monomers such as methyl(meth)acrylate, ethyl(meth)acrylate, n-propyl(meth)acrylate, isopropyl(meth)acrylate, n-butyl(meth)acrylate, isobutyl(meth)acrylate, pentyl(meth)acrylate, 2-ethylhexyl(meth)acrylate, decyl(meth)acrylate, dodecyl(meth)acrylate, stearyl(meth)acrylate, α-chloroethyl (meth)acrylate, cyclohexyl(meth)acrylate, phenyl(meth)acrylate, methoxyethyl(meth)acrylate, ethoxyethyl(meth)acrylate, methoxypropyl(meth)acrylate and ethoxypropyl (meth)acrylate; styrene type monomers such as styrene, methylstyrene, chlorostyrene and methoxystyrene; carboxyl group-containing monomers such as (meth)acrylic acid, crotonic acid, itaconic acid, itaconic acid half ester, maleic acid and maleic acid half ester; hydroxyl group-containing monomers such as 2-hydroxyethyl(meth)acrylate, 2(3)-hydroxypropyl(meth)acrylate, 4-hydroxybutyl acrylate and mono(meth)acrylic acid ester of allyl alcohol polyhydric alcohol; amide group-containing monomers such as (meth)acrylamide and maleinamide; amide group-containing monomers such as 2-aminoethyl(meth)acrylate, dimethylaminoethyl(meth)acrylate, 3-aminopropyl(meth)acrylate, 2-butylaminoethyl(meth)acrylate and vinylpyridine; epoxy group-containing monomers and oligomers obtained by reacting an active hydrogen atom-containing monomer with an epoxy compound having at least 2 glycidyl groups, glycidyl(meth)acrylate or allylglycidyl ether; N-methylol acrylamide having a N-methylol group, vinyl acetate, vinyl chloride, ethylene, butadiene, acrylonitrile, dialkyl fumarate, and the like.

As described above, these comonomers are used optionally in such a combination as to provide an emulsion polymer forming the outermost phase having a Tg value of from −50° C. to 10° C. and a binder having a MFT value of at most 10° C.

Also, as an ethylenic unsaturated monomer used for an emulsion polymer forming at least one phase of inner phases of different phase structure emulsion particles, the same ethylenic unsaturated monomers as illustrated above can be used, but it is necessary to use them optionally in such a combination as to provide an emulsion polymer having a Tg value of from 30 to 110° C. and a binder having a MFT value of at most 10° C.

The emulsion polymer for forming the outermost phase and the emulsion polymer for forming at least one phase of the inner phases are prepared by using monomers in such a combination as to satisfy the above required Tg and MFT values, but it is appropriate to select monomers to be used, in such a manner as to make a Tg value difference between the both emulsion polymers at least 30° C. and to provide a binder comprising different phase structure emulsion particles, the MFT value of which is lower than a MFT value of a polymer obtained by uniformly emulsion-polymerizing total monomers for the both emulsion polymers at one stage.

Also, when using a carboxyl group-containing monomer as an ethylenic unsaturated monomer, it may be neutralized with a neutralizing agent such as ammonia, dimethylethanolamine or triethanolamine.

A resin composition for an aqueous paint of the present invention contains different phase structure emulsion particles obtained by the above-mentioned multi-stage emulsion polymerization method as a binder, and this binder may be used in a dispersion (emulsion) state in water as a clear paint, but in order to impart various functions to a paint, it is preferable to incorporate various additives such as a dispersant, an anti-settling agent, a thickening agent, an antiseptic agent, a UV ray-absorber, or a photostabilizer.

A paint obtained in this manner is applicable to various inorganic materials, a metal material, a wood material or a plastic material, and provides an excellent coating film by air-drying or force-drying at a temperature of at most 100° C.

EXAMPLES

Hereinafter, the present invention is further illustrated with reference to Examples. In the Examples, "part" and "%" are based on mass standard unless otherwise specified.

Example 1 to 4 and Comparative Examples 4 to 8

200 Parts of ion-exchanged water, 1 part of sodium hydrogencarbonate (pH regulator), and 3 parts of ammonium polyoxyethylene alkylphenyl sulfate (emulsifier) "Hitenol N-08" (manufactured by Daiichi Kogyo Seiyaku K. K.) were charged into a reactor equipped with a stirrer, a thermometer, a cooling tube and a dropping apparatus, and were heated to 80° C. while flowing nitrogen to substitute the content in the reactor, and 1 part of potassium persulfate (polymerization initiator) was then added thereto, and an emulsified material (A) shown in the following Table 1 and Table 2 previously mixed by stirring in a separate container was continuously dropwise added thereto for 3 hours.

After finishing the dropwise adding of the first stage, the reaction temperature was lowered to 70° C. for 1 hour. Thereafter, an emulsified material (B) as shown in the following Tables 1 and 2 previously mixed by stirring in the same manner as in the first stage was continuously dropwise added for 3 hours. After finishing the dropwise adding, the reaction mixture was aged by continuously stirring at 70° C. for 2 hours, and the mixture was cooled to 25° C., and was adjusted to pH of 8.5 with 28% aqueous ammonia to prepare an aqueous resin composition having different phase (two phases) structure emulsion resin particles dispersed.

Comparative Examples 1 to 3

200 Parts of ion-exchanged water, 1 part of sodium hydrogencarbonate and 3 parts of ammonium polyoxyethylene alkylphenyl sulfate were charged into a reactor equipped with a stirrer, a thermometer, a cooling tube and a dropping apparatus, and were heated to 80° C. while flowing nitrogen to substitute the content in the reactor, and 1 part of potassium persulfate was then added thereto, and an emulsified material (A) as shown in Table 2 previously mixed by stirring in a separate container was continuously dropwise added thereto for 4 hours. After finishing the dropwise adding, the reaction mixture was aged while stirring at 80° C. for 2 hours, and was cooled to 25° C., and was adjusted to a pH of 8.5 with 28% aqueous ammonia to prepare an aqueous resin composition having uniform structure emulsion resin particles dispersed.

The abbreviations of the materials shown in the following Tables 1 and 2 have the following meanings. Also, the figures in the parentheses ( ) of the respective materials mean a Tg value of a homopolymer of each monomer used in calculation of a glass transition temperature.
MMA: Methyl methacrylate (105° C.)
BA: Butyl acrylate (−54° C.)
2EHA: 2-Ethylhexyl acrylate (−50° C.)
AA: Acrylic acid (106° C.)
PEG monomer (1): Polyethylene glycol chain-containing monomer (−50° C.)
$H_2C=C(CH_3)-C(=O)-O(CH_2CH_2O)_8H$
PEG monomer (2): Polyethylene glycol chain-containing monomer (−50° C.)
$H_2C=CH-CH_2-O-(CH_2CH_2O)_5H$
PPG monomer: Polypropylene glycol chain-containing monomer (−50° C.)
$H_2C=C(CH_3)-C(=O)-O-(CH_2CH(CH_3)O)_6H$ Also, in the Tg values shown in the following Tables 1 and 2, "total (° C.)" means a Tg value of a polymer obtained by one stage emulsion polymerization of a mixture of an emulsified material A and an emulsified material B, and "inner phase/outermost phase (° C.)" means "Tg value of polymer obtained by emulsion polymerization of emulsified material A/Tg value of polymer obtained by emulsion polymerization of emulsified material B".

Aqueous resin compositions obtained in Examples 1 to 4 and Comparative Examples 1 to 8 were subjected to each test of measuring minimum film-forming temperature (MFT), freezing-thawing stability, low temperature film-formability, tackiness, anti-blocking property and water resistance, and their results are shown at the lower part of Tables 1 and 2.

The tests were carried out in the following manner.
Minimum film-forming temperature An emulsion was coated in a thickness of 0.2 mm by an applicator on an aluminum plate having a temperature gradient of from 0° C. to 40° C. After drying, the state of a coating film was observed, and a temperature at a boundary position where a continuous coating film was formed, was determined to be a minimum film-forming temperature.

Freezing-thawing stability

Each aqueous resin composition was filled in a 1 l metal-made can having the inner surface coated, and the can was sealed and placed in a refrigerator at −20° C. for 24 hours to freeze the content.

Thereafter, the can was taken out of the refrigerator, and was allowed to stand at 20° C. for 24 hours. Thereafter, the composition was stirred, and the state of the composition was visually observed by eye, and a viscosity change was measured before and after the test, and the composition was coated on a glass plate by a 6 mil applicator to visually observe an outer appearance of the coating film.

Evaluation standard

◯: There was no solidified material, there was no viscosity change and an outer appearance of a coating film was satisfactory.

Δ: There was a viscosity change, but there was no solidified material and an outer appearance of a coating film was satisfactory.

×: There was a gelled or solidified material.

Low temperature film-formability

Each aqueous resin composition was coated on a glass plate by a 6 mil applicator at 10° C. in a temperature controlled room, and was allowed to stand for 1 day. An outer appearance of the coating film thus obtained was visually judged by eye.

Evaluation standard

◯: A film was completely formed without causing cloudiness and cracks.

Δ: A film was mostly formed, but there were locally cracks.

×: There were observed cracks and cloudiness extensively, and a film was not formed at all.

Tackiness (acceleration of pollution)

Each aqueous resin composition was coated on a glass plate by a 6 mil applicator, and was force-dried at 80° C. for 5 minutes, and was then cooled to 20° C., and a carbon paper was placed on the surface of the coating film thus obtained, and a weight was placed thereon to apply a load of 0.01 kg/cm$^2$ for 24 hours. Thereafter, the carbon paper was slowly peeled off, and an outer appearance of the coating film where the load was applied, was visually observed by eye.

Evaluation standard

◯: There was substantially no carbon attached.

Δ: Carbon was locally attached.

×: Carbon was attached at least 70% of the part where the load was applied.

Blocking property

Each aqueous resin composition was coated on a glass plate by a 6 mil applicator, and was force-dried at 80° C. for 5 minutes, and was then cooled to 20° C., and was placed on a hot plate heated at 30° C.

Thereafter, a gauze was placed on the surface of the coating film thus obtained, and a weight heated to 30° C. was placed thereon to apply a load of 0.05 kg/cm2 for 30 minutes. Thereafter, after cooling to 20° C., the gauze was slowly peeled off, and at that time, a resistance to the peeling off and a trace of the gauze were visually observed by eye.

Evaluation standard ⊚: The gauze naturally dropped, and there was substantially no trace of the gauze on a coating film.

◯: The gauze did not naturally drop, but there is substantially no trace of the gauze on a coating film.

Δ: The gauze did not naturally drop, but could be peeled off with a small force, and a trace of the gauze was slightly remained.

×: When peeling the gauze, a part of a coating film was also peeled off, and a trace of the gauze was clearly and severely remained.

Water resistance

Each aqueous resin composition was coated on a glass plate by a 6 mil applicator, and was force-dried at 80° C. for 5 minutes, and was allowed to be cooled to 20° C.

Thereafter, the glass plate having the coating film was dipped in a hot water of 50° C. for 24 hours, and an outer appearance of the coating film was visually observed by eye immediately after taking out from the hot water, and the glass plate was allowed to stand at 20° C. for 24 hours to be dried and to visually observe an outer appearance of the coating film by eye.

Evaluation standard

◯: There was less whitening of the coating film, and after drying, the coating film was completely recovered to be such a clear coating film as before dipping in the hot water.

Δ: There was a slight whitening of the coating film, but after drying, the coating film was almost recovered to be such a clear coating film as before dipping in the hot water.

×: The coating film was severely whitened, and after drying, the coating film could not be recovered to be such a clear coating film as before dipping in the hot water.

Table 1

| | Starting material | Ex. 1 | Ex. 2 | Ex. 3 | Ex. 4 |
|---|---|---|---|---|---|
| Emulsified material A (inner phase) | MMA | 225 | 210 | 160 | 210 |
| | BA | 15 | | 80 | |
| | 2EHA | | 30 | | 30 |
| | AA | 10 | 10 | 10 | 10 |
| | PEG monomer (1) | | | | |
| | PPG monomer | | | | |
| | Hitenol N-08 | 4 | 4 | 4 | 4 |
| | Water | 120 | 120 | 120 | 120 |
| Emulsified material B (outermost phase) | MMA | 90 | 100 | 90 | 100 |
| | BA | 125 | | 125 | |
| | 2EHA | | 115 | | 105 |
| | AA | 10 | 10 | 10 | 10 |
| | PEG monomer (1) | 25 | | | |
| | PEG monomer (2) | | | | 35 |
| | PPG monomer | | 25 | 25 | |
| | Hitenol N-08 | 4 | 4 | 4 | 4 |
| | Water | 120 | 120 | 120 | 120 |
| Tg: Total (° C.) | | 39 | 33 | 10 | 33 |
| Inner phase/outermost phase (° C.) | | (89/−9) | (76/−1) | (34/−10) | (76/−1) |
| MFT (° C.) | | 5≧ | 5≧ | 5≧ | 5≧ |
| Freezing-thawing stability | | ◯ | ◯ | ◯ | ◯ |
| Low temperature film-formability | | ◯ | ◯ | ◯ | ◯ |
| Tackiness (accelerated pollution) | | ◯ | ◯ | ◯ | ◯ |
| Anti-blocking property | | ⊚ | ⊚ | ◯ | ⊚ |
| Water resistance | | ◯ | ◯ | ◯ | ◯ |

TABLE 2

| | Starting material | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Emulsified material A (inner phase) | MMA | 315 | 310 | 250 | 172 | 210 | 210 | 210 | 100 |
| | BA | 140 | | 205 | | | | | |
| | 2EHA | | 145 | | 68 | 30 | 30 | 5 | 140 |
| | AA | 20 | 20 | 20 | 10 | 10 | 10 | 10 | 10 |
| | PEG monomer (1) | 25 | | 25 | | | | | |
| | PPG monomer | | 25 | | | | | 25 | |
| | Hitenol N-08 | 8 | 8 | 8 | 4 | 4 | 4 | 4 | 4 |
| | Water | 240 | 240 | 240 | 120 | 120 | 120 | 120 | 120 |
| Emulsified material B (outermost phase) | MMA | | | | 102 | 100 | 100 | 100 | 210 |
| | BA | | | | | | | | |
| | 2EHA | | | | 113 | 140 | 15 | 140 | 5 |
| | AA | | | | 10 | 10 | 10 | 10 | 10 |
| | PEG monomer (1) | | | | | | | | |
| | PEG monomer (2) | | | | | | | | |
| | PPG monomer | | | | 25 | | 125 | | 25 |
| | Hitenol N-08 | | | | 4 | 4 | 4 | 4 | 24 |
| | Water | | | | 120 | 120 | 120 | 120 | 120 |
| Tg: Total (° C.) | | 39 | 33 | 10 | 33 | 33 | 33 | 33 | 33 |
| Inner phase/outermost phase (° C.) | | | | | (45/22) | (76/−1) | (76/−1) | (76/−1) | (8/76) |
| MFT (° C.) | | 58 | 55 | 18 | 45–55 | 5≧ | 5≧ | 5≧ | 55≧ |
| Freezing-thawing stability | | Δ | Δ | Δ | ○ | X | ○ | Δ | ○ |
| Low temperature film-formability | | X | X | X | X | ○ | ○ | ○ | X |
| Tackiness (accelerated pollution) | | ○ | ○ | Δ | ○ | ○ | Δ | ○ | ○ |
| Anti-blocking property | | Δ | Δ | X | Δ | ⊙ | ⊙ | ⊙ | Δ |
| Water resistance | | ○ | ○ | Δ | ○ | ○ | X | ○ | ○ |

As evident from Table 1, the aqueous resin compositions of Examples 1 to 4 of the present invention have an excellent in freezing-thawing stability, low temperature film-formability, tackiness, anti-blocking property and water resistance even without containing a VOC.

On the other hand, the aqueous resin compositions of Comparative Examples 1 to 3 containing not emulsion particles of different phase structure but emulsion particles of uniform phase structure as a binder were all poor in freezing-thawing stability, low temperature film-formability and anti-blocking property.

Further, the aqueous resin compositions of Comparative Examples 4 and 8 containing different phase structure emulsion particles, the outermost phases of which have a glass transition point exceeding 10° C., as a binder, were poor in low temperature film-formability and anti-blocking property.

Still further, the aqueous resin compositions of Comparative Examples 5 and 7, the outermost phases of which do not contain an ethylenic unsaturated monomer having a polyethylene glycol chain or a polypropylene glycol chain, were poor in freezing-thawing stability.

Also, Comparative Example 6, the outermost phase of which contains an excess amount of a polypropylene glycol chain, was poor in water resistance.

Since a VOC content of a resin composition for an aqueous paint of the present invention is low, it is possible to prevent environmental pollution and odor, and the resin composition of the present invention is excellent in freezing-thawing stability and low temperature film-formability and forms a coating film excellent in anti-blocking property and water resistance.

What is claimed is:

1. A resin composition for an aqueous paint, comprising:
    different phase structure emulsion particles obtained by multi-stage emulsion polymerization as a binder;
    wherein the different phase structure emulsion particles have an outermost phase formed by an emulsion polymer of an ethylenic unsaturated monomer, said emulsion polymer having a glass transition temperature of from −50° C. to 10° C., and
    wherein said resin composition satisfies the following conditions (1) to (3):
    (1) the emulsion polymer forming the outermost phase of the different phase structure emulsion particles contains from 1 to 20 mass % of an ethylenic unsaturated monomer having at least one a unit selected from the group consisting of a polyethylene glycol chain, a polypropylene glycol chain and a mixture thereof;
    (2) at least one phase of inner phases from the outermost phase of the different phase structure emulsion particles comprises an emulsion polymer of an ethylenic unsaturated monomer, said emulsion polymer having a glass transition temperature of from 30° C. to 110° C., and
    (3) the binder has a minimum film-forming temperature of at most 10° C.;
    wherein the ethylenic unsaturated monomer having the polyethylene glycol chain or the polypropylene glycol chain is represented by formula (1), $$CH_2=C(R^1)-C(=O)-O-[X-O]_n-R^2 \quad (1)$$

wherein
    $R^1$ is H or $CH_3$,
    $R^2$ is H or a $C_1$–$C_8$ alkyl group,
    X is —$(CH_2)_2$— or —$CH_2CH(CH_3)$—, and
    n is an integer of from 1 to 30.

2. A resin composition for an aqueous paint, comprising:
    different phase structure emulsion particles obtained by multi-stage emulsion polymerization as a binder;
    wherein the different phase structure emulsion particles have an outermost phase formed by an emulsion polymer of an ethylenic unsaturated monomer, said emulsion polymer having a glass transition temperature of from −50° C. to 10° C., and wherein said resin composition satisfies the following conditions (1) to (3):
(1) the emulsion polymer forming the outermost phase of the different phase structure emulsion particles contains from 1 to 20 mass % of an ethylenic unsaturated monomer having at least one a unit selected from the group consisting of a polyethylene glycol chain, a polypropylene glycol chain and a mixture thereof;
(2) at least one phase of inner phases from the outermost phase of the different phase structure emulsion particles comprises an emulsion polymer of an ethylenic unsaturated monomer, said emulsion polymer having a glass transition temperature of from 30° C. to 110° C., and
(3) the binder has a minimum film-forming temperature of at most 10° C.;

wherein the ethylenic unsaturated monomer having the polyethylene glycol chain or the polypropylene glycol chain is represented by formula (2),

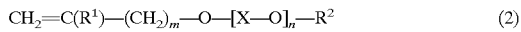  (2)

wherein
$R^1$ is H or $CH_3$,
$R^2$ is H or a $C_1$–$C_8$ alkyl group,
X is —$(CH_2)_2$— or —$CH_2CH(CH_3)$—,
n is an integer of from 1 to 30, and
m is an integer of from 1 to 30.

3. A resin composition for an aqueous paint, comprising:
different phase structure emulsion particles obtained by multi-stage emulsion polymerization as a binder;
wherein the different phase structure emulsion particles have an outermost phase formed by an emulsion polymer of an ethylenic unsaturated monomer, said emulsion polymer having a glass transition temperature of from −50° C. to 10° C., and wherein said resin composition satisfies the following conditions (1) to (3):
(1) the emulsion polymer forming the outermost phase of the different phase structure emulsion particles contains from 1 to 20 mass % of an ethylenic unsaturated monomer having a polyethylene glycol chain and a polypropylene glycol chain;
(2) at least one phase of inner phases from the outermost phase of the different phase structure emulsion particles comprises an emulsion polymer of an ethylenic unsaturated monomer, said emulsion polymer having a glass transition temperature of from 30° C. to 110° C., and
(3) the binder has a minimum film-forming temperature of at most 10° C.;

wherein the ethylenic unsaturated monomer having the polyethylene glycol chain and the polypropylene glycol chain is represented by formula (3),

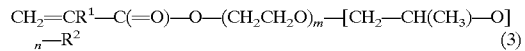  (3)

wherein
$R^1$ is H or $CH_3$,
$R^2$ is H or a $C_1$–$C_8$ alkyl group, and
m and n are an integer of from 1 to 30.

4. The resin composition according to claim 1, wherein said emulsion polymer forming the outermost phase of the different phase structure emulsion particles contains from 5 to 15 mass % of said ethylenic unsaturated monomer.

5. The resin composition according to claim 1, wherein the glass transition temperature of said emulsion polymer forming the outermost phase of the different phase structure emulsion particles is from −30° C. to 0° C.

6. The resin composition according to claim 2, wherein the glass transition temperature of said emulsion polymer forming the inner phase of the different phase structure emulsion particles is from 34° C. to 90° C.

7. The resin composition according to claim 2, wherein the binder has a minimum film-forming temperature of at most 5° C.

8. The resin composition according to claim 2, wherein said emulsion polymer forming the outermost phase of the different phase structure emulsion particles contains from 5 to 15 mass % of said ethylenic unsaturated monomer.

9. The resin composition according to claim 2, wherein the glass transition temperature of said emulsion polymer forming the outermost phase of the different phase structure emulsion particles is from −30° C. to 0° C.

10. The resin composition according to claim 2, wherein the glass transition temperature of said emulsion polymer forming the inner phase of the different phase structure emulsion particles is from 34° C. to 90° C.

11. The resin composition according to claim 2, wherein the binder has a minimum film-forming temperature of at most 5° C.

12. The resin composition according to claim 2, wherein $R^2$ in formula (2) is a $C_1$–$C_8$ alkyl group.

13. The resin composition according to claim 3, wherein said emulsion polymer forming the outermost phase of the different phase structure emulsion particles contains from 5 to 15 mass % of said ethylenic unsaturated monomer.

14. The resin composition according to claim 3, wherein the glass transition temperature of said emulsion polymer forming the outermost phase of the different phase structure emulsion particles is from −30° C. to 0° C.

15. The resin composition according to claim 3, wherein the glass transition temperature of said emulsion polymer forming the inner phase of the different phase structure emulsion particles is from 34° C. to 90° C.

16. The resin composition according to claim 3, wherein the binder has a minimum film-forming temperature of at most 5° C.

* * * * *